US012079754B2

(12) United States Patent
Dursun et al.

(10) Patent No.: US 12,079,754 B2
(45) Date of Patent: Sep. 3, 2024

(54) WELL COMPLETION OPERATIONS INTELLIGENT ADVISORY BASED ON DIMENSION EMBEDDING

(71) Applicant: Saudi Arabian Oil Company, Dhahran (SA)

(72) Inventors: Serkan Dursun, Dhahran (SA); Abdullah Mohammed Alabdullatif, Dhahran (SA); Sarafudheen M. Veettil Tharayi, Dhahran (SA); Yaqeen A. Mahdi, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 191 days.

(21) Appl. No.: 17/653,078

(22) Filed: Mar. 1, 2022

(65) Prior Publication Data

US 2023/0281537 A1 Sep. 7, 2023

(51) Int. Cl.
*G06Q 10/0633* (2023.01)
(52) U.S. Cl.
CPC ............... *G06Q 10/0633* (2013.01)
(58) Field of Classification Search
CPC .......................................... G06Q 10/00–50/00
USPC ................................................. 705/7.11–7.42
See application file for complete search history.

(56) References Cited

U.S. PATENT DOCUMENTS 9,514,388 B2 * 12/2016 Chen .................... G06N 3/006
2010/0040281 A1 * 2/2010 Chen ...................... G06N 3/08
340/853.2

| 2015/0278407 | A1* | 10/2015 | Vennelakanti | E21B 43/00 703/7 |
|---|---|---|---|---|
| 2016/0274027 | A1* | 9/2016 | Perkins | G02B 5/285 |
| 2017/0096881 | A1* | 4/2017 | Dusterhoft | G06N 7/01 |
| 2018/0188403 | A1* | 7/2018 | Halsey | G01V 1/50 |
| 2019/0153840 | A1 | 5/2019 | Bacon et al. | |
| 2020/0124753 | A1* | 4/2020 | Halsey | G06F 30/20 |

(Continued)

OTHER PUBLICATIONS

Chai, Zhi, et al. "An integrated closed-loop solution to assisted history matching and field optimization with machine learning techniques." Journal of Petroleum Science and Engineering 198 (2021): 108204. (Year: 2021).*

(Continued)

*Primary Examiner* — Alan S Miller
(74) *Attorney, Agent, or Firm* — Fish & Richardson P.C.

(57) ABSTRACT

Systems and methods include a method for providing plots for challenges, successes, and failures in well completions. A challenges-successes-failures database is created from historical data collected from past well completions. The database identifies: 1) challenges encountered during well completions, 2) corresponding successes and failures, and 3) job parameters used during well completions. A dimension embedding algorithm is selected to represent the data. Hyper-parameter tuning is performed on the algorithm. The dimension embedding model is generated and added to a system pipeline for a new well completion job. Nonlinear dimension embedding algorithms are run against data points in the cleaned and processed data using the challenges-successes-failures database and new job parameters entered in a user interface. Scatter plots of two-dimensional (2D) points are generated and labeled with each point's job parameters.

20 Claims, 6 Drawing Sheets

(56) References Cited

U.S. PATENT DOCUMENTS

2021/0102527 A1* 4/2021 Liu .................. G05B 23/0254
2022/0114302 A1* 4/2022 Skripkin ................ G06N 20/20

OTHER PUBLICATIONS

Orrù, Pier Francesco, et al. "Machine learning approach using MLP and SVM algorithms for the fault prediction of a centrifugal pump in the oil and gas industry." Sustainability 12.11 (2020): 4776. (Year: 2020).*

Gottumukkala et al., "Digital Transformation of Well Completion Selection and Design Through Data Insights," SPE Annual Technical Conference and Exhibition, Oct. 2020, 18 pages.

Pankaj et al., "Application of Data Science and Machine Learning for Well Completion Optimization," Offshore Technology Conference, Apr. 2018, 16 pages.

Wang et al., "Development of a Machine-Learning-Based Workflow for Well Completion Optimization in Permian Basin," SPE/AAPG/SEG Unconventional Resources Technology Conference, Jul. 2020, 14 pages.

* cited by examiner

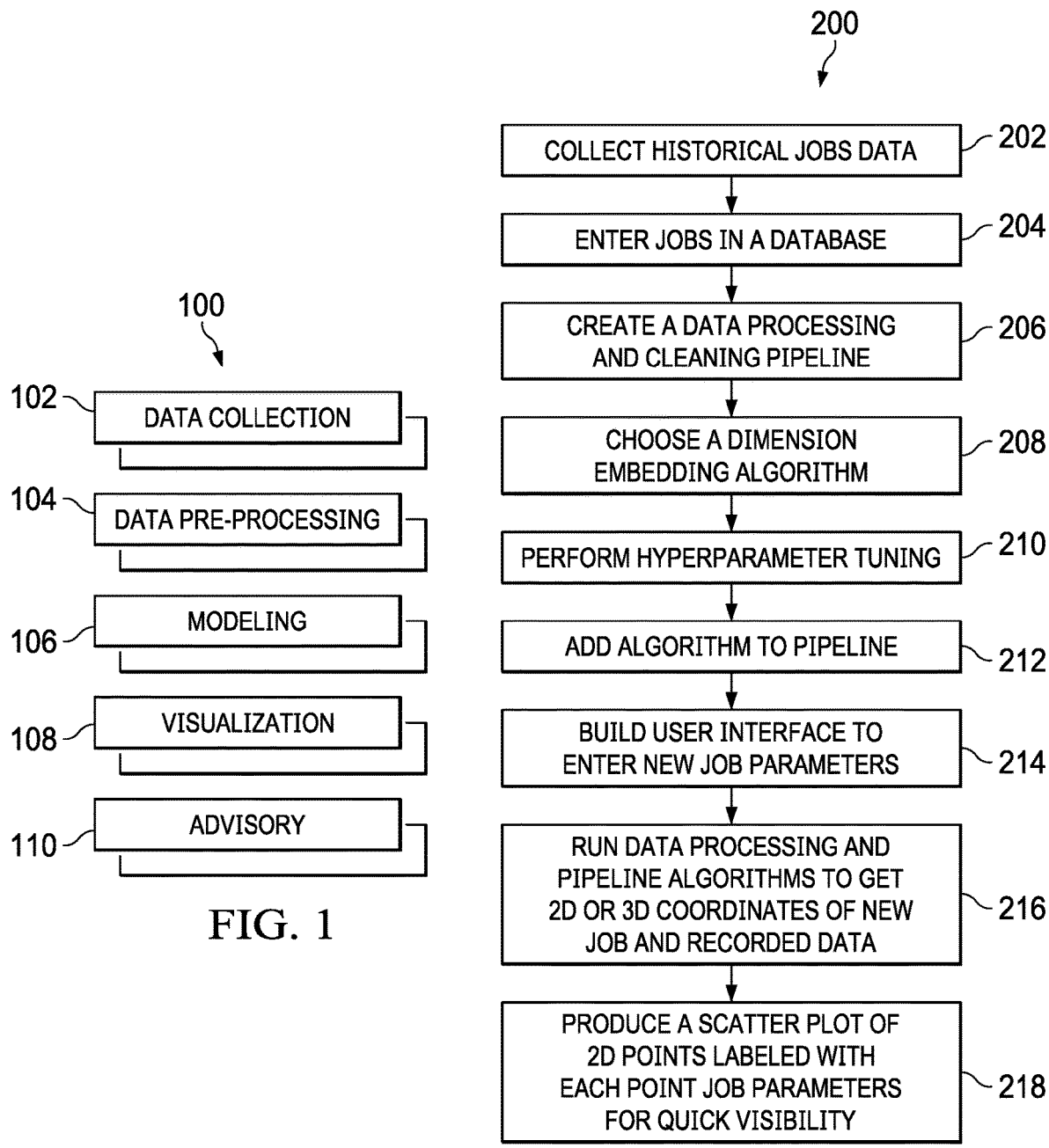

WELL COMPLETION OPERATIONS INTELLIGENT ADVISORY BASED ON DIMENSION EMBEDDING

TECHNICAL FIELD

The present disclosure applies to techniques used in gas and oil well completions.

BACKGROUND

Well completion operations typically include processes for making gas or oil wells ready for production. During a well completion job, challenges may occur which need to be addressed or corrected. Each well completion job includes the planning and execution of a well completion including, but not limited to, coil tubing and milling operations. Well completion includes the assembly of downhole piping and equipment needed for safe and effective production from a gas or oil well. Challenges that occur during well completions can include issues encountered during the execution of a well completion job including, but not limited to, motor failure, motor stalling, lost circulation, stuck milling tools, and mill deformation. Features associated with well completion jobs can include input variables used in the well completion. The input variables can be represented using a column in tabular data format including, but not limited to, field, formation, reservoir, well geometry, mill type, mill size, motor type, weight on bit, wellbore fluid, depth, and bottom hole pressure. Dimensions can be associated with the number of input variables that can be represented as columns in tabular data, such as a three-column table with headings of X1, X2, and X3.

Data science areas associated with well completion can include dimensionality reduction in which mathematical algorithms are applied to reduce the dimensions of a dataset and to preserve a percentage of the variance between data points. Various dimension reduction/embedding algorithms can be used, including matrix decomposition techniques such as principle component analysis (PCA) and singular value decomposition (SVD) and manifold learning techniques, which is more suitable to nonlinear data, such as isometric mapping and T-distributed Stochastic Neighbor Embedding (t-SNE). Feature engineering (FE) can include the process of manipulating input features before using them in machine learning (ML) development. A common FE technique is one hot encoding, where categorical input variables are converted into a column for each value, and assigned 0 or 1 as an indicator of whether that value is present or not.

SUMMARY

The present disclosure describes techniques for providing advisory information for use in well completions operations planning by leveraging nonlinear embedding of historical failed and successfully completed jobs. In some implementations, a computer-implemented method includes the following. A challenges-successes-failures database is created that stores cleaned and processed data collected from a history of well completions for wells in the past, where the challenges-successes-failures database identifies: 1) challenges encountered during the well completions, 2) successes and failures that resulted during the well completions corresponding to the challenges, and 3) job parameters used during the well completions. A dimension embedding algorithm is selected to be used to represent the cleaned and processed data. Hyper-parameter tuning is performed on the dimension embedding algorithm. After hyper-parameter tuning is performed, the dimension embedding model is generated and added to a system pipeline for a new well completion job. Nonlinear dimension embedding algorithms are run against data points in the cleaned and processed data collected from the history of well completions using the challenges-successes-failures database and new job parameters entered in a user interface for the new well completion job. Scatter plots of two-dimensional (2D) points are generated in response to running the nonlinear dimension embedding algorithms. The scatter plots of the 2D points are labeled with each point's job parameters for the new well completion job and the wells in the past.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Techniques described in the present disclosure can be used to solve technical problem(s) of providing information based on past completion challenges as new but similar challenges are encountered in newly-planned jobs. For example, data-driven similarity analysis can be performed to learn from recorded challenges and to optimize operations for the new jobs. This can provide an advantage over conventional approaches that are based on supervised learning to optimize operations. One difference between the two approaches is that in supervised learning, the objective is to make predictions of a predefined target such as cumulative production of hydrocarbons (daily or monthly). Techniques of the present disclosure can focus on the similarities between new and completed jobs in completion operations. This can provide the users with a tool to minimize issues associated with encountering the same types of challenges. The techniques can be based on nonlinear dimension embedding on well completion information in order to enhance well completion operations. Using the techniques can improve operational safety and risk avoidance by eliminating potential well intervention operations that would otherwise be needed to overcome challenges that are encountered.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 1 is a block diagram illustrating system components of an advisory system, according to some implementations of the present disclosure.

FIG. 2 is a flow diagram of an example of a workflow for producing a scatterplot of two-dimensional (2D) points, according to some implementations of the present disclosure.

Like reference numbers and designations in the various drawings indicate like elements.

DETAILED DESCRIPTION

Figure 3:
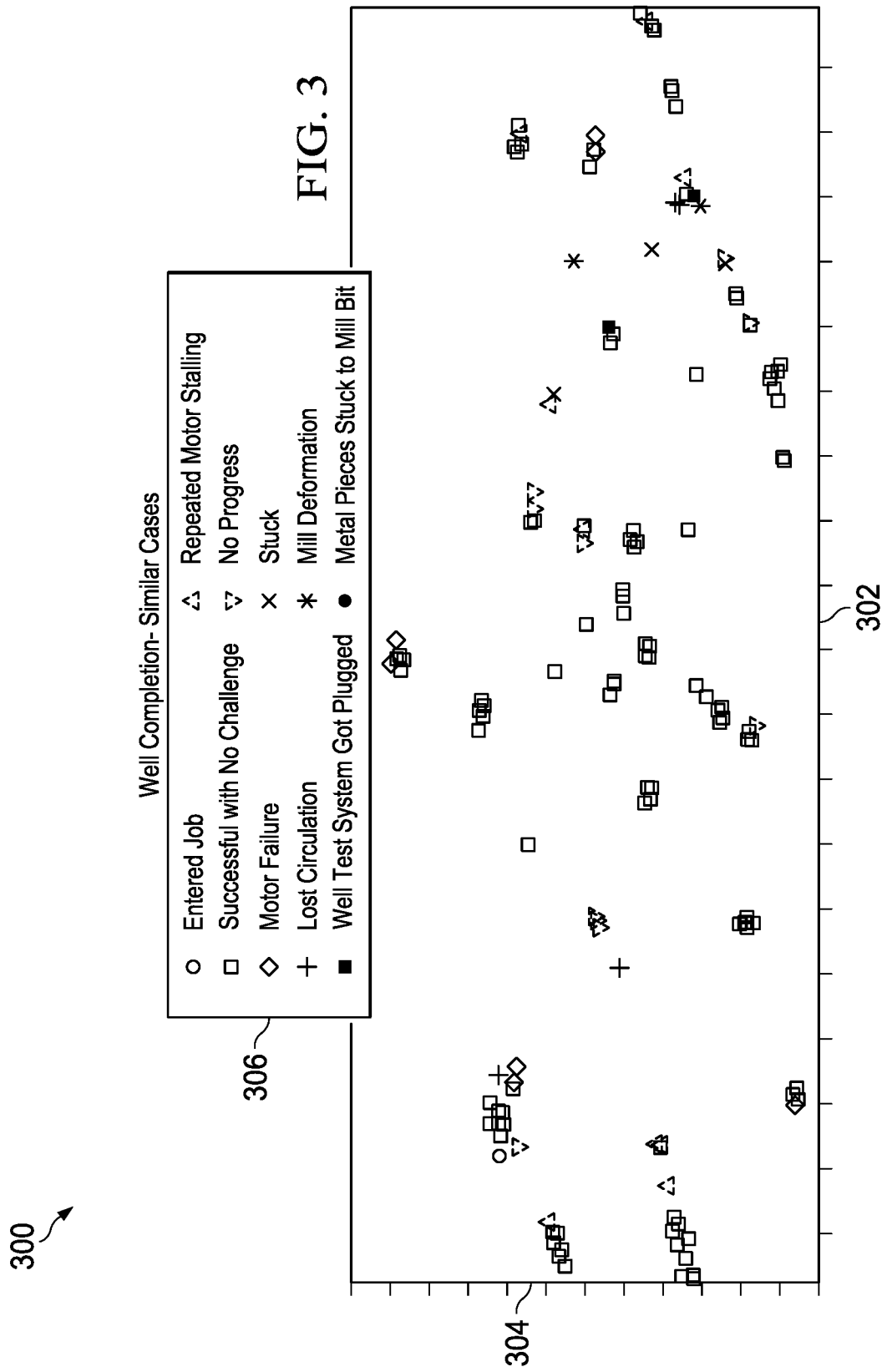
FIG. 3 is a diagram showing an example of a scatterplot identifying locations of failures in past completions, according to some implementations of the present disclosure.

The following detailed description describes techniques for providing an advisory system for well completions operations planning by leveraging nonlinear embedding of historical failed and successfully completed jobs. The advisory system can suggest or provide corrective actions to mitigate challenges and problems of well completions. The planning and execution of future jobs can be improved by minimizing the likelihood of repeatedly facing the same types of challenges. Doing so can minimize costs, reduce risks, and optimize well completion operations. For example, optimization can refer to achieving well completion operations having metrics that indicate or result in a performance greater than a predefined threshold.

Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The present disclosure generally relates to an advisory system that uses advanced analytics and specifically relates to data science. The advisory system and corresponding methods can apply nonlinear dimension embedding to identify similarities between a newly-planned well completion job and historical completions. The similarities can be based on distance metrics, for example. Determining similarities can be based on common pair-wise distance metrics including, but not limited to, Cityblock, Cosine, Euclidean, Haversine, or Manhattan. The distances can be used to generate similarity scores which can be used in the dimension embedding process.

The techniques can use new and completed well completion jobs' features and nonlinear dimension embedding algorithms to compute synthetic two-dimensional (2D) and three-dimensional (3D) coordinates of all jobs. The coordinates can then be used to produce scatter plots of all jobs in one or both of a 2D or 3D space. The plots can allow users to analyze completed jobs that are similar to a new planned job in order to learn from past challenges, if any, and adjust new job parameters (e.g., mill type, mill size, motor type, and weight on bit).

Techniques can rely on data science techniques and can be data-driven. Furthermore, analysis results can improve over time, such as to be more accurate, as new wells are created and new data points and challenges are recorded.

Techniques can include building a database of completed well completion jobs' parameters and challenges. The database can be built using information obtained from human entry of data. For example, once a new planned job parameter is entered for investigation, the advisory system can compute the coordinates of all completed jobs associated with the new job parameters to produce a plot for analysis by the planner.

The analysis can include use of a method for similarity modeling by way of programming. For example, given a set of known well completion job variables (dimensions) and associated success or challenge results, the advisory system can use the disclosed method to visualize the similarities in a lower dimension embedded space.

Techniques can include applying common feature engineering techniques to transform numerical and categorical features into features suitable for dimension embedding algorithms. Common feature engineering can include, for example, normalization, categorical encoding, and one hot encoding.

As an example, a new planned well completion job can be denoted as $j_0 \in J$. A set of finished well completion jobs can be denoted as $j_1, j_2, \ldots, j_n \in J$. A matrix X of feature engineered job parameters can be denoted as:

$$X = \begin{bmatrix} x_{0,0} & \cdots & x_{0,m} \\ \vdots & \ddots & \vdots \\ x_{n,0} & \cdots & x_{n,m} \end{bmatrix} \quad (1)$$

A known set of job challenges plus successes $y_1, y_2, \ldots, y_n \in Y$ and corrective actions $c_1, c_2, c_n \in C$ can be represented as:

TABLE 1

Challenges, successes, and corrective action

| J | X | | Y | C |
|---|---|---|---|---|
| $j_0$ | $x_{0,0}$ | $\cdots$ $x_{0,m}$ | NA | NA |
| $j_1$ | $x_{1,0}$ | $\cdots$ $x_{1,m}$ | $y_1$ | $c_1$ |
| $j_2$ | $x_{2,0}$ | $\cdots$ $x_{2,m}$ | $y_2$ | $c_2$ |
| $\ldots$ | $\ldots$ | $\ldots$ | $\ldots$ | $\ldots$ |
| $j_n$ | $x_{n,0}$ | $\cdots$ $x_{n,m}$ | $y_n$ | $c_n$ |

The advisory system can use X to produce an embedding matrix R with reduced dimension d as follows:

$$R = \begin{bmatrix} r_{0,0} & \cdots & r_{0,d} \\ \vdots & \ddots & \vdots \\ r_{n,0} & \cdots & r_{n,d} \end{bmatrix} \quad (2)$$

where R is used as coordinates for all jobs in which the coordinates for $j_n \in J$ are $r_{n,0}, \ldots, r_{n,d}$. The advisory system can plot the jobs in a d dimension plot and can label the plot by $y_1, y_2, \ldots, y_n \in Y$. The plot can be used to visualize the closeness between a new job $j_0$ and previous jobs in order to learn from $c_1, c_2, \ldots, c_n \in C$ and to adjust parameters of job $j_0$ if needed.

In some implementations, output generated by the advisory system can be presented to the user in the form of a report or a static plot. The plot can include jobs embedded in a 2D plot. The plot can also highlight the job parameters and corrective action using a lookup mechanism.

FIG. 1 is a block diagram illustrating system components of an advisory system 100, according to some implementations of the present disclosure. In some implementations, the advisory system 100 can be decomposed into modular components, including one or more combinations of a data collection module 102, a data pre-processing module 104, a modeling module 106, a visualization module 108, and one or more advisory modules 110.

Processing by the advisory system 100 can begin by using the data collection module 102 to collect the data of finished well completion jobs. The data collection module 102 can be used for collecting historical well completion jobs and their corresponding parameters and lesson learned, if any. Also, data collection module 102 can be used to store the collected jobs in a database. Historical data can be collected, for example, in the form of $([x_1 \ldots x_m]_n, y_n, c_n)$. The gathered data can be entered into a database.

Using the data pre-processing module 104, a pre-possessing and feature engineering can be performed. This data pre-processing module 104 can handle invalid parameters and missing values in the collected jobs. The module can also handle categorical values and numerical values and prepare them for modeling.

A dimension embedding algorithm can be selected through data science experience and experimentation, and optimal hyper-parameters can be selected using a process of hyper-parameter tuning. An interface can be created to enter a new job or jobs, with a user-selectable tool or option for running the previous steps to produce the 2D or 3D coordinates. For example, the 2D or 3D coordinates can be produced by the modeling module 106 which is used for selecting algorithms and fitting the algorithms onto the processed data to produce the embedding The coordinates can be used to produce a dynamic visualization (e.g., using the visualization module 108) of all jobs and to analyze proximity between new jobs and historical ones with quick access to each of the job parameters. In general, the visualization module 108 can produce plots of the generated embedding from the modeling component. The module can also cover styling and create interactive tools for the plot.

The advisory module 110 can use the embedding results and the plot to improve future job decisions by utilizing highlighted nearby jobs' parameters and lessons learned. For example, the advisory module 110 can provide advice based on the proximity between new jobs and historical ones.

FIG. 2 is a flow diagram of an example of a workflow 200 for producing a scatterplot of 2D points, according to some implementations of the present disclosure. At 202, historical jobs data for past completion jobs is collected. At 204, information about the past completion jobs is entered in a database. At 206, a data processing and cleaning pipeline is created. At 208, a dimension embedding algorithm is chosen. At 210, hyper parameter tuning is performed. At 212, an algorithm is added to the pipeline. At 214, user interface is built to enter new job parameters. At 216, data processing and algorithms are run against the pipeline to generate 2D and 3D coordinates of the new job relative to recorded data of past completion jobs. At 218, a scatter plot of 2D points is generated and labeled with each point's job parameters for quick visibility.

FIG. 3 is a diagram showing an example of a scatterplot 300 identifying locations of failures in past completions, according to some implementations of the present disclosure. The locations can be plotted relative to a first dimension 302 and a second dimension 304 of an embedded space. The points can be annotated according to a key 306 that identifies specific types of successes and failures.

Figure 4:
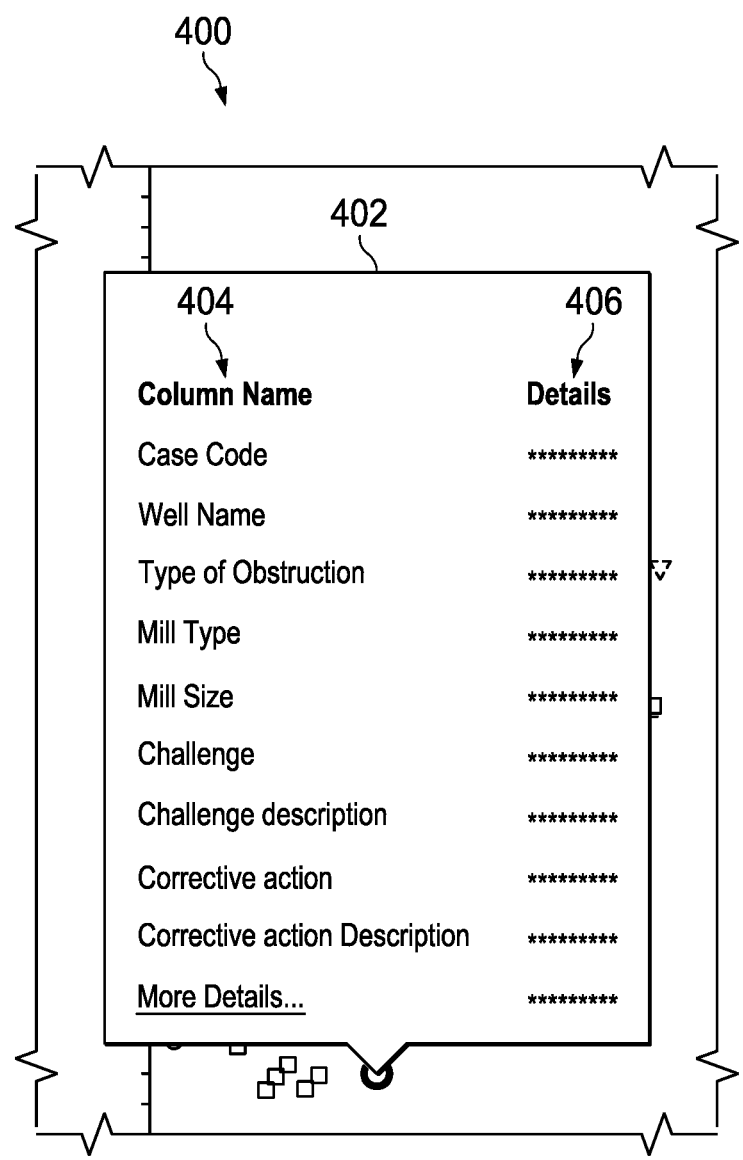
FIG. 4 is a diagram showing an example of a detailed information display, according to some implementations of the present disclosure.

FIG. 4 is a diagram showing an example of a detailed information display 400, according to some implementations of the present disclosure. The detailed information display 400 can be displayed when a specific point of the scatterplot 300 is selected (e.g., clicked on by the user). The detailed information display 400 includes a detailed information popup 402. Each line in the detailed information popup 402 identifies a particular parameter 404 and its corresponding details 406 (e.g., values of the parameter).

Figure 5:
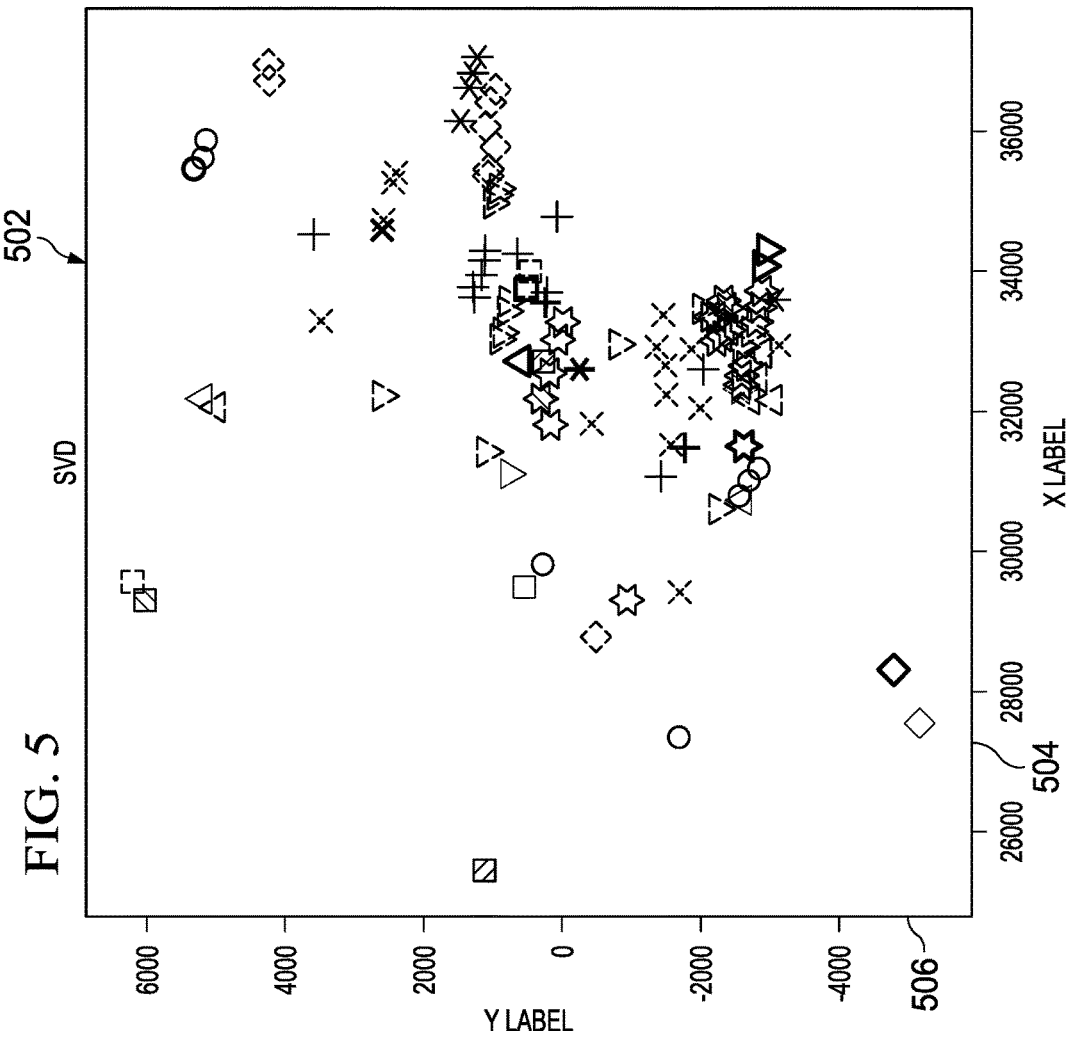
FIG. 5 is a diagram showing an example of a scatterplot identifying locations of failures in past completions, according to some implementations of the present disclosure.

FIG. 5 is a diagram showing an example of a scatterplot 500 identifying locations of failures in past completions, according to some implementations of the present disclosure. The locations are plotted in a map 502 and plotted relative to a first dimension 504 and a second dimension 506. The points can be annotated according to a key 508 that identifies specific types of failures. The jobs to be plotted can be filtered by the user (e.g., using a plot interface) using any attributes such as well geometry and reservoir.

Figure 6:
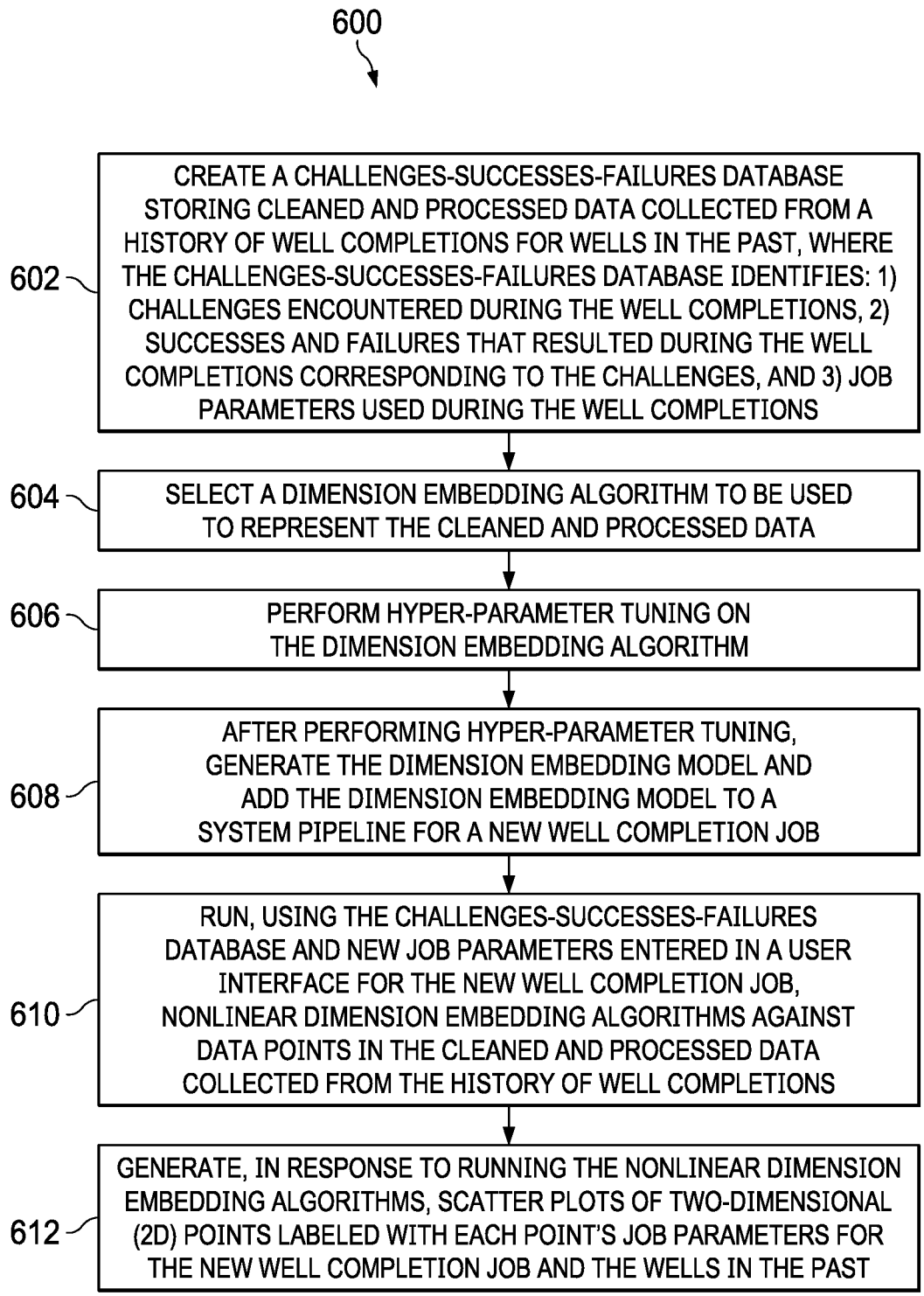
FIG. 6 is a flowchart of an example of a method for generating scatter plots of 2D points for a new well completion job and wells in the past, according to some implementations of the present disclosure.

FIG. 6 is a flowchart of an example of a method 600 for generating scatter plots of two-dimensional (2D) points for a new well completion job and wells in the past, according to some implementations of the present disclosure. For clarity of presentation, the description that follows generally describes method 600 in the context of the other figures in this description. However, it will be understood that method 600 can be performed, for example, by any suitable system, environment, software, and hardware, or a combination of systems, environments, software, and hardware, as appropriate. In some implementations, various steps of method 600 can be run in parallel, in combination, in loops, or in any order.

At 602, a challenges-successes-failures database is created that stores cleaned and processed data collected from a history of well completions for wells in the past, where the challenges-successes-failures database identifies: 1) challenges encountered during the well completions, 2) successes and failures that resulted during the well completions corresponding to the challenges, and 3) job parameters used during the well completions. For example, the system 100 can collect and pre-process the data, as described with reference to FIG. 1. Successes of the cleaned and processed data can be stored in a table of challenges, successes, and corrective actions, e.g., in Table 1. Jobs can be stored as success with no challenges or as complete with challenges, for example. Types of challenges can be stored as motor failure, for example. From 602, method 600 proceeds to 604.

At 604, a dimension embedding algorithm is selected to be used to represent the cleaned and processed data. For example, the selection can be made as described with reference to step 208 of FIG. 2. From 604, method 600 proceeds to 606.

At 606, hyper-parameter tuning is performed on the dimension embedding algorithm. For example, performing the hyper-parameter tuning on the dimension embedding algorithm can include providing a user interface for entering parameters for a new well completion job, with a user-selectable option for running steps to produce 2D coordinates and three dimensional (3D) coordinates. For example, the hyper-parameter tuning can be performed as described with reference to step 210 of FIG. 2. From 606, method 600 proceeds to 608.

At 608, after hyper-parameter tuning is performed, the dimension embedding model is generated and added to a system pipeline for the new well completion job. From 608, method 600 proceeds to 610.

At 610, nonlinear dimension embedding algorithms are run against data points in the cleaned and processed data collected from the history of well completions using the challenges-successes-failures database and new job parameters entered in a user interface for the new well completion job. From 610, method 600 proceeds to 612.

At 612, scatter plots of two-dimensional (2D) points are generated in response to running the nonlinear dimension embedding algorithms. The scatter plots of the 2D points are labeled with each point's job parameters for the new well completion job and the wells in the past. The scatter plots of 2D points are annotated, for each point, with a marking selected from Entered Job, Successful With No Challenges, Repeated Motor Stalling, No Progress, Motor Failure, Lost Circulation, Stuck, Mill Deformation, Metal Pieces Stick To Mill Bit, And Well Test System Got Plugged. Examples of similar types of successful and failure cases are displayed in FIG. 3.

In some implementations, selecting a point in the scatter plots of 2D points can initiate a display of an informational popup identifying values for the 2D point including a case code, a well name, a type of obstruction, a mill type, a mill size, a challenge, a challenge description, a corrective action, and a corrective action description. For example, FIG. 4 shows an example of the informational popup. After 612, method 600 can stop.

In some implementations, in addition to (or in combination with) any previously-described features, techniques of the present disclosure can include the following. Customized user interfaces can present intermediate or final results of the above described processes to a user. The presented information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change or an improvement in drilling parameters (including speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 7:
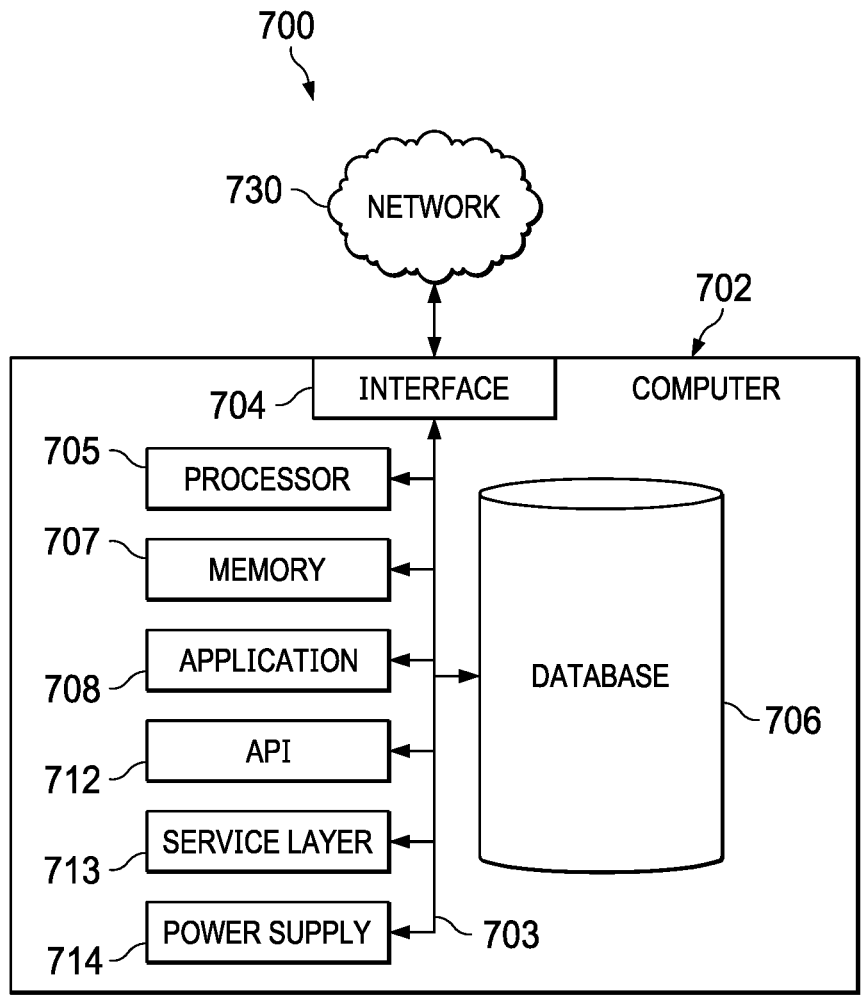
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

For example, in a first implementation, a computer-implemented method includes the following. A challenges-successes-failures database is created that stores cleaned and processed data collected from a history of well completions for wells in the past, where the challenges-successes-failures database identifies: 1) challenges encountered during the well completions, 2) successes and failures that resulted during the well completions corresponding to the challenges, and 3) job parameters used during the well completions. A dimension embedding algorithm is selected to be used to represent the cleaned and processed data. Hyper-parameter tuning is performed on the dimension embedding algorithm. After hyper-parameter tuning is performed, the dimension embedding model is generated and added to a system pipeline for a new well completion job. Nonlinear dimension embedding algorithms are run against data points in the cleaned and processed data collected from the history of well completions using the challenges-successes-failures database and new job parameters entered in a user interface for the new well completion job. Scatter plots of two-dimensional (2D) points are generated in response to running the nonlinear dimension embedding algorithms. The scatter plots of the 2D points are labeled with each point's job parameters for the new well completion job and the wells in the past.

The foregoing and other described implementations can each, optionally, include one or more of the following features:

A first feature, combinable with any of the following features, where performing the hyper-parameter tuning on the dimension embedding algorithm includes providing a user interface for entering parameters for the new well completion job, with a user-selectable option for running steps to produce 2D coordinates and three dimensional (3D) coordinates.

A second feature, combinable with any of the previous or following features, where the scatter plots of 2D points are annotated, for each point, with a marking selected from Entered Job, Successful With No Challenges, Repeated Motor Stalling, No Progress, Motor Failure, Lost Circulation, Stuck, Mill Deformation, Metal Pieces Stick To Mill Bit, And Well Test System Got Plugged.

A third feature, combinable with any of the previous or following features, where selecting a point in the scatter plots of 2D points initiates display of an informational popup identifying values for the 2D point including a case code, a well name, a type of obstruction, a mill type, a mill size, a challenge, a challenge description, a corrective action, and a corrective action description.

A fourth feature, combinable with any of the previous or following features, where the cleaned and processed data collected from the history of well completions is stored in a table of challenges, successes, and corrective actions.

A fifth feature, combinable with any of the previous or following features, where selecting the dimension embedding algorithm includes selecting a dimension for dimension embedding algorithm to represent high-dimensional data instances of completion jobs in a low-dimensional space for visualization purposes.

A sixth feature, combinable with any of the previous or following features, where the low-dimensional space is 2D or 3D.

In a second implementation, a non-transitory, computer-readable medium stores one or more instructions executable by a computer system to perform operations including the following. A challenges-successes-failures database is created that stores cleaned and processed data collected from a history of well completions for wells in the past, where the challenges-successes-failures database identifies: 1) challenges encountered during the well completions, 2) successes and failures that resulted during the well completions corresponding to the challenges, and 3) job parameters used during the well completions. A dimension embedding algorithm is selected to be used to represent the cleaned and processed data. Hyper-parameter tuning is performed on the dimension embedding algorithm. After hyper-parameter tuning is performed, the dimension embedding model is generated and added to a system pipeline for a new well completion job. Nonlinear dimension embedding algorithms are run against data points in the cleaned and processed data collected from the history of well completions using the challenges-successes-failures database and new job parameters entered in a user interface for the new well completion job. Scatter plots of two-dimensional (2D) points are generated in response to running the nonlinear dimension embedding algorithms. The scatter plots of the 2D points are labeled with each point's job parameters for the new well completion job and the wells in the past.

The foregoing and other described implementations can each, optionally, include one or more of the following features:

A first feature, combinable with any of the following features, where performing the hyper-parameter tuning on the dimension embedding algorithm includes providing a user interface for entering parameters for the new well completion job, with a user-selectable option for running steps to produce 2D coordinates and three dimensional (3D) coordinates.

A second feature, combinable with any of the previous or following features, where the scatter plots of 2D points are annotated, for each point, with a marking selected from Entered Job, Successful With No Challenges, Repeated Motor Stalling, No Progress, Motor Failure, Lost Circulation, Stuck, Mill Deformation, Metal Pieces Stick To Mill Bit, And Well Test System Got Plugged.

A third feature, combinable with any of the previous or following features, where selecting a point in the scatter plots of 2D points initiates display of an informational popup identifying values for the 2D point including a case code, a well name, a type of obstruction, a mill type, a mill size, a challenge, a challenge description, a corrective action, and a corrective action description.

A fourth feature, combinable with any of the previous or following features, where the cleaned and processed data collected from the history of well completions is stored in a table of challenges, successes, and corrective actions.

A fifth feature, combinable with any of the previous or following features, where selecting the dimension embedding algorithm includes selecting a dimension for dimension embedding algorithm to represent high-dimensional data instances of completion jobs in a low-dimensional space for visualization purposes.

A sixth feature, combinable with any of the previous or following features, where the low-dimensional space is 2D or 3D.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A challenges-successes-failures database is created that stores cleaned and processed data collected from a history of well completions for wells in the past, where the challenges-successes-failures database identifies: 1) challenges encountered during the well completions, 2) successes and failures that resulted during the well completions corresponding to the challenges, and 3) job parameters used during the well completions. A dimension embedding algorithm is selected to be used to represent the cleaned and processed data. Hyper-parameter tuning is performed on the dimension embedding algorithm. After hyper-parameter tuning is performed, the dimension embedding model is generated and added to a system pipeline for a new well completion job. Nonlinear dimension embedding algorithms are run against data points in the cleaned and processed data collected from the history of well completions using the challenges-successes-failures database and new job parameters entered in a user interface for the new well completion job. Scatter plots of two-dimensional (2D) points are generated in response to running the nonlinear dimension embedding algorithms. The scatter plots of the 2D points are labeled with each point's job parameters for the new well completion job and the wells in the past.

The foregoing and other described implementations can each, optionally, include one or more of the following features:

A first feature, combinable with any of the following features, where performing the hyper-parameter tuning on the dimension embedding algorithm includes providing a user interface for entering parameters for the new well completion job, with a user-selectable option for running steps to produce 2D coordinates and three dimensional (3D) coordinates.

A second feature, combinable with any of the previous or following features, where the scatter plots of 2D points are annotated, for each point, with a marking selected from Entered Job, Successful With No Challenges, Repeated Motor Stalling, No Progress, Motor Failure, Lost Circulation, Stuck, Mill Deformation, Metal Pieces Stick To Mill Bit, And Well Test System Got Plugged.

A third feature, combinable with any of the previous or following features, where selecting a point in the scatter plots of 2D points initiates display of an informational popup identifying values for the 2D point including a case code, a well name, a type of obstruction, a mill type, a mill size, a challenge, a challenge description, a corrective action, and a corrective action description.

A fourth feature, combinable with any of the previous or following features, where the cleaned and processed data collected from the history of well completions is stored in a table of challenges, successes, and corrective actions.

A fifth feature, combinable with any of the previous or following features, where selecting the dimension embedding algorithm includes selecting a dimension for dimension embedding algorithm to represent high-dimensional data instances of completion jobs in a low-dimensional space for visualization purposes.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    creating a challenges-successes-failures database storing cleaned and processed data collected from a history of well completions for wells, wherein the challenges-successes-failures database identifies: challenges encountered during the well completions, successes and failures that resulted during the well completions corresponding to the challenges, and job parameters used during the well completions;
    selecting a dimension embedding algorithm to be used to represent the cleaned and processed data;
    performing hyper-parameter tuning on the dimension embedding algorithm;
    generating, using the dimension embedding algorithm, a dimension embedding model;
    adding the dimension embedding model to a system pipeline for a new well completion job;
    receiving new job parameters corresponding to the new well completion job;
    running, using the challenges-successes-failures database and the new job parameters, nonlinear dimension embedding algorithms against data points in the cleaned and processed data collected from the history of well completions;
    generating, in response to running the nonlinear dimension embedding algorithms, scatter plots of two-dimensional (2D) points labeled with each point's job parameters for the new well completion job and the wells in the past; and
    executing a well completion operation for the new well completion job using a labeled job parameter of the scatter plots of 2D points.

2. The computer-implemented method of claim 1, wherein performing the hyper-parameter tuning on the dimension embedding algorithm comprises providing a user interface for entering parameters for the new well completion job, with a user-selectable option for running steps to produce 2D coordinates and three dimensional (3D) coordinates.

3. The computer-implemented method of claim 1, wherein the scatter plots of 2D points are annotated, for each point, with a marking selected from Entered Job, Successful With No Challenges, Repeated Motor Stalling, No Progress, Motor Failure, Lost Circulation, Stuck, Mill Deformation, Metal Pieces Stick To Mill Bit, And Well Test System Got Plugged.

4. The computer-implemented method of claim 1, wherein selecting a 2D point in the scatter plots of 2D points initiates display of an informational popup identifying values for the 2D point comprising a case code, a well name, a type of obstruction, a mill type, a mill size, a challenge, a challenge description, a corrective action, and a corrective action description.

5. The computer-implemented method of claim 1, wherein the cleaned and processed data collected from the history of well completions is stored in a table of challenges, successes, and corrective actions.

6. The computer-implemented method of claim 1, wherein selecting the dimension embedding algorithm comprises selecting a dimension for dimension embedding algorithm to represent high-dimensional data instances of completion jobs in a low-dimensional space for visualization purposes.

7. The computer-implemented method of claim 6, wherein the low-dimensional space is 2D or 3D.

8. A non-transitory, computer-readable medium storing one or more instructions executable by a computer system to perform operations comprising:
    creating a challenges-successes-failures database storing cleaned and processed data collected from a history of well completions for wells, wherein the challenges-successes-failures database identifies: challenges encountered during the well completions, successes and failures that resulted during the well completions corresponding to the challenges, and job parameters used during the well completions;
    selecting a dimension embedding algorithm to be used to represent the cleaned and processed data;
    performing hyper-parameter tuning on the dimension embedding algorithm;
    generating, using the dimension embedding algorithm, a dimension embedding model;
    adding the dimension embedding model to a system pipeline for a new well completion job;
    receiving new job parameters corresponding to the new well completion job;
    running, using the challenges-successes-failures database and the new job parameters, nonlinear dimension embedding algorithms against data points in the cleaned and processed data collected from the history of well completions;
    generating, in response to running the nonlinear dimension embedding algorithms, scatter plots of two-dimensional (2D) points labeled with each point's job parameters for the new well completion job and the wells in the past; and
    executing a well completion operation for the new well completion job using a labeled job parameter of the scatter plots of 2D points.

9. The non-transitory, computer-readable medium of claim 8, wherein performing the hyper-parameter tuning on the dimension embedding algorithm comprises providing a user interface for entering parameters for the new well completion job, with a user-selectable option for running steps to produce 2D coordinates and three dimensional (3D) coordinates.

10. The non-transitory, computer-readable medium of claim 8, wherein the scatter plots of 2D points are annotated, for each point, with a marking selected from Entered Job, Successful With No Challenges, Repeated Motor Stalling, No Progress, Motor Failure, Lost Circulation, Stuck, Mill Deformation, Metal Pieces Stick To Mill Bit, And Well Test System Got Plugged.

11. The non-transitory, computer-readable medium of claim 8, wherein selecting a 2D point in the scatter plots of 2D points initiates display of an informational popup identifying values for the 2D point comprising a case code, a well name, a type of obstruction, a mill type, a mill size, a challenge, a challenge description, a corrective action, and a corrective action description.

12. The non-transitory, computer-readable medium of claim 8, wherein the cleaned and processed data collected from the history of well completions is stored in a table of challenges, successes, and corrective actions.

13. The non-transitory, computer-readable medium of claim 8, wherein selecting the dimension embedding algorithm comprises selecting a dimension for dimension embedding algorithm to represent high-dimensional data instances of completion jobs in a low-dimensional space for visualization purposes.

14. The non-transitory, computer-readable medium of claim 13, wherein the low-dimensional space is 2D or 3D.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
creating a challenges-successes-failures database storing cleaned and processed data collected from a history of well completions for wells, wherein the challenges-successes-failures database identifies: challenges encountered during the well completions, successes and failures that resulted during the well completions corresponding to the challenges, and job parameters used during the well completions;
selecting a dimension embedding algorithm to be used to represent the cleaned and processed data;
performing hyper-parameter tuning on the dimension embedding algorithm;
generating, using the dimension embedding algorithm, a dimension embedding model;
adding the dimension embedding model to a system pipeline for a new well completion job;
receiving new job parameters corresponding to the new well completion job;
running, using the challenges-successes-failures database and the new job parameters, nonlinear dimension embedding algorithms against data points in the cleaned and processed data collected from the history of well completions;
generating, in response to running the nonlinear dimension embedding algorithms, scatter plots of two-dimensional (2D) points labeled with each point's job parameters for the new well completion job and the wells in the past; and
executing a well completion operation for the new well completion job using a labeled job parameter of the scatter plots of 2D points.

16. The computer-implemented system of claim 15, wherein performing the hyper-parameter tuning on the dimension embedding algorithm comprises providing a user interface for entering parameters for the new well completion job, with a user-selectable option for running steps to produce 2D coordinates and three dimensional (3D) coordinates.

17. The computer-implemented system of claim 15, wherein the scatter plots of 2D points are annotated, for each point, with a marking selected from Entered Job, Successful With No Challenges, Repeated Motor Stalling, No Progress, Motor Failure, Lost Circulation, Stuck, Mill Deformation, Metal Pieces Stick To Mill Bit, And Well Test System Got Plugged.

18. The computer-implemented system of claim 15, wherein selecting a 2D point in the scatter plots of 2D points initiates display of an informational popup identifying values for the 2D point comprising a case code, a well name, a type of obstruction, a mill type, a mill size, a challenge, a challenge description, a corrective action, and a corrective action description.

19. The computer-implemented system of claim 15, wherein the cleaned and processed data collected from the history of well completions is stored in a table of challenges, successes, and corrective actions.

20. The computer-implemented system of claim 15, wherein selecting the dimension embedding algorithm comprises selecting a dimension for dimension embedding algorithm to represent high-dimensional data instances of completion jobs in a low-dimensional space for visualization purposes.

* * * * *